(12) United States Patent
Weinstein et al.

(10) Patent No.: US 9,990,925 B2
(45) Date of Patent: *Jun. 5, 2018

(54) PRIVACY-PRESERVING TRAINING CORPUS SELECTION

(71) Applicant: Google LLC, Mountain View, CA (US)

(72) Inventors: Eugene Weinstein, New York, NY (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/842,019

(22) Filed: Dec. 14, 2017

(65) Prior Publication Data

US 2018/0108355 A1    Apr. 19, 2018

(51) Int. Cl.
| | |
|---|---|
| *G10L 15/26* | (2006.01) |
| *G10L 15/06* | (2013.01) |
| *G10L 15/28* | (2013.01) |
| *G06F 21/62* | (2013.01) |
| *H04W 4/02* | (2018.01) |
| *H04W 4/12* | (2009.01) |

(52) U.S. Cl.
CPC .......... *G10L 15/26* (2013.01); *G06F 21/6254* (2013.01); *G10L 15/06* (2013.01); *G10L 15/063* (2013.01); *G10L 15/28* (2013.01); *H04W 4/02* (2013.01); *G06F 2221/2111* (2013.01); *G10L 2015/0636* (2013.01); *H04W 4/12* (2013.01)

(58) Field of Classification Search
CPC ....... G10L 15/26; G10L 15/063; G10L 15/06; G10L 2015/0636; H04W 4/02; H04W 4/12; G06F 21/6254; G06F 2221/2111

USPC .......................................................... 704/235
See application file for complete search history.

(56) References Cited

U.S. PATENT DOCUMENTS

| | | | | |
|---|---|---|---|---|
| 8,473,451 | B1 * | 6/2013 | Hakkani-Tur | G06F 21/00 379/201.11 |
| 8,494,853 | B1 * | 7/2013 | Mengibar | G10L 15/065 704/233 |
| 8,554,559 | B1 * | 10/2013 | Aleksic | G10L 15/30 704/235 |

(Continued)

FOREIGN PATENT DOCUMENTS

WO    2014/133525    9/2014

OTHER PUBLICATIONS

International Preliminary Report on Patentability issued in International Application No. PCT/US2016/033773, dated Jan. 11, 2018, 10 pages.

(Continued)

*Primary Examiner* — Edwin S Leland, III
(74) *Attorney, Agent, or Firm* — Fish & Richardson P.C.

(57) ABSTRACT

The present disclosure relates to training a speech recognition system. A system that includes an automated speech recognizer and receives data from a client device. The system determines that at least a portion of the received data is likely sensitive data. Before the at least a portion of the received data is deleted, the system provides the at least a portion of the received data to a model training engine that trains recognition models for the automated speech recognizer. After the at least a portion of the received data is provided, the system deletes the at least a portion of the received data.

20 Claims, 4 Drawing Sheets

(56) References Cited

U.S. PATENT DOCUMENTS

| | | | | |
|---|---|---|---|---|
| 2007/0244700 | A1* | 10/2007 | Kahn | G10L 15/22 704/235 |
| 2010/0312555 | A1* | 12/2010 | Plumpe | G10L 15/065 704/231 |
| 2011/0099602 | A1* | 4/2011 | Apparao | G06Q 10/06 726/1 |
| 2012/0059652 | A1* | 3/2012 | Adams | G10L 15/19 704/235 |
| 2012/0072219 | A1* | 3/2012 | Johnston | G06F 17/30979 704/251 |
| 2012/0130709 | A1* | 5/2012 | Bocchieri | G10L 15/063 704/201 |
| 2014/0032219 | A1* | 1/2014 | Lerner | G10L 25/48 704/270.1 |
| 2014/0129226 | A1* | 5/2014 | Lee | G10L 15/04 704/254 |
| 2014/0207442 | A1* | 7/2014 | Ganong, III | H04W 12/02 704/201 |
| 2014/0278425 | A1* | 9/2014 | Jost | G10L 15/063 704/257 |
| 2014/0278426 | A1* | 9/2014 | Jost | G10L 15/063 704/257 |
| 2014/0304839 | A1* | 10/2014 | Hansen | G06F 21/6209 726/29 |
| 2016/0379639 | A1* | 12/2016 | Weinstein | H04W 4/02 704/235 |

OTHER PUBLICATIONS

Brants et al., "Large language models in machine translation," in EMNLP, Jun. 2007, pp. 858-867.
Cooper, "A survey of query log privacy-enhancing techniques from a policy perspective," ACM Transactions on the Web (TWEB), 2(4):1-27, Oct. 1, 2008, XP055295765.
Dean et al., "Large scale distributed deep networks," in NIPS, Dec. 2012, pp. 1232-1240.
Deng and Dahl, "Roles of pre-training and fine-tuning in context-dependent DBN-HMMs for real-world speech recognition," in NIPS, 2010, 8 pages.
Hinton et al., "Deep neural networks for acoustic modeling in speech recognition: The shared views of four research groups," IEEE Signal Process. Mag., vol. 29, No. 6, pp. 82-97, Nov. 2012.
Huang et al., "Semi-supervised GMM and DNN acoustic model training with multi-system combination and confidence re-calibration," in INTERSPEECH, Aug. 2013, pp. 2360-2364.
International Search Report and Written Opinion in International Application No. PCT/US2016/033773, dated Aug. 24, 2016, 15 pages.
Jaitly et al., "Application of pretrained deep neural networks to large vocabulary speech recognition," in INTERSPEECH, 2012.
Jiang, "Confidence measures for speech recognition: A survey," Speech Communication, vol. 45, No. 4, pp. 455-470, Apr. 2005.
Kuo and Goel, "Active learning with minimum expected error for spoken language understanding," in INTERSPEECH, Sep. 2005, pp. 437-440.
Lamel et al., "Lightly supervised and unsupervised acoustic model training," Computer Speech and Language, vol. 16, No. 1, pp. 115-229, Jan. 2002.
Liao et al., "Large scale deep neural network acoustic modeling with semi-supervised training data for youtube video transcription," in Workshop on Automatic Speech Recognition and Understanding (ASRU), 2013, 6 pages.
Ma and Schwartz, "Unsupervised versus supervised training of acoustic models," in INTERSPEECH, Sep. 2008, pp. 2374-2377.
Sak et al., "Long Short-Term Memory Based Recurrent Neural Network Architectures for Large Vocabulary Speech Recognition," arXiv:1402.1128v1 [cs.NE], Feb. 5, 2014, 5 pages.
Schalkwyk et al., "Google search by voice: A case study," Advances in Speech Recognition: Mobile Environments, Call Centers and Clinics, pp. 61-20, Sep. 2010.
Siohan, "Training data selection based on context-dependent state matching," in ICASSP, 2014.
Young et al., "Tree-based state tying for accuracy acoustic modelling," in Proceedings of the Workshop on Human Language Technology, 1994, pp. 307-312.
Yu et al., "Unsupervised training and directed manual transcription for LVCSR," Speech Communication, vol. 52, No. 7-8, pp. 652-663, Jul. 2010.
Zeiler et al., "On rectified linear units for speech processing," in 38th International Conference on Acoustics, Speech and Signal Processing (ICASSP), 2013.

* cited by examiner

PRIVACY-PRESERVING TRAINING CORPUS SELECTION

CROSS-REFERENCE TO RELATED APPLICATION

This application is a continuation of U.S. application Ser. No. 14/753,912, filed Jun. 29, 2015, the contents of which are incorporated by reference herein.

TECHNICAL FIELD

This specification generally relates to automated speech recognition.

BACKGROUND

Speech recognition relates to the transcription of words spoken by a human. In performing speech recognition, acoustic and language models are used by automated speech recognition (ASR) engines to statistically analyze an encoded utterance in order to generate one or more likely transcriptions that reflect the words spoken by the speaker.

SUMMARY

According to one implementation, this specification describes a process for identifying sensitive information among data that a user submits to a recognition system, e.g., an ASR, and for using that information for training recognizer models, e.g., optical recognition models, acoustic models or language models, that are used by subsequent iterations of the recognition system, before the sensitive information is deleted. In doing so, the further iterations of the recognition system are able to more accurately recognize submitted data that includes similar sensitive information, while complying with all appropriate data privacy schemes relating to the collection or storage of sensitive information.

In some aspects, the subject matter described in this specification may be embodied in methods that may include the actions of receiving, by a system that includes an automated speech recognizer, data from a client device and determining that at least a portion of the received data is likely sensitive data, where sensitive data is data that is deleted by the system without being stored in a log of data that is received from client devices, or that is deleted within a predetermined period of time of receipt by the system. Additional actions may include, before the at least a portion of the received data is deleted, providing the at least a portion of the received data to a model training engine that trains recognition models for the automated speech recognizer. Further actions may include after the at least a portion of the received data is provided, deleting the at least a portion of the received data.

Other versions include corresponding systems, apparatus, and computer programs, configured to perform the actions of the methods, encoded on computer storage devices.

These and other versions may each optionally include one or more of the following features. For instance, in some implementations, the received data includes one or more of audio data, transcription data, and contextual metadata. In certain aspects, the predetermined period of time is shorter than a default period of time after which data determined to not be likely sensitive is deleted.

In some aspects, actions include determining that at least a portion of the received data is likely sensitive data includes providing the at least a portion of the received data to a plurality of classifiers, where each classifier of the plurality of classifiers is associated with a different type of sensitive data and receiving an indication from a particular classifier associated with a particular type of sensitive data that the at least a portion of the received data is indicating as associated with the particular type of sensitive data, above a confidence threshold. In some implementations, each type of sensitive data has an associated predetermined period of time for deletion.

In certain aspects, actions include anonymizing the at least a portion of the received data and storing the anonymized data in the log of data that is received from client devices. In some aspects, actions include receiving, from the model training engine, an updated recognition model, providing the updated recognition model to the automated speech recognizer, and using the updated recognition model to recognize subsequently received audio data.

In some implementations, sensitive data includes one or more of contact information, background audio data, personally identifying information, predetermined transcription keywords, and geographic coordinates.

Advantageous implementations may include one or more of the following features. Instead of assuming that there is some static utterance or data set, e.g., queries from a new phone, new noise condition, or a new accent, to which speech recognition models to be adapted, the described speech recognition techniques may be always training in a continuous loop as speech recordings come into the logs. This addresses the challenge that certain speech utterances and/or context information that are needed to recognize the utterances accurately may not be loggable and may need to be removed from systems quickly, e.g., within seconds, minutes, days, etc. With the technique described herein, the model training can follow a distributed backpropagation neural network training implementation. The selection and transcription algorithms may be incorporated into the production setup, and data points may be fed into the training servers in a real-time basis as the data points arrive in in the logs. The described technique can potentially allow large speech recognition systems to operate with more success in markets where challenging legal environments dictate that logging must be kept to a minimum or where logs must be implemented in ephemeral storage.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The training of acoustic models for speech recognition can involve algorithms that consume substantial computational resources, e.g., hundreds, or even thousands of machines, and take a very long time, e.g., a week or more, to achieve good quality. Some training approaches assume that audio recordings of speech data can always be stored, which may not be the case due to user privacy restrictions. In a privacy-sensitive production setting, speech data sometimes cannot be logged, or can be logged for only a short period of time. Sometimes additional context information that is needed to transcribe the utterance accurately cannot be logged.

As an example, contacts recognition for voice actions such as "send a text message to John" may require that the user's contacts be known to the speech recognizer at the time the recognition is done. This information may be accessible when the production query comes in, but storing the contact database of the user may have various privacy implications. Such contextual information can sometimes allow large speech recognition quality gains.

Accordingly, the present disclosure describes techniques for using sensitive data in training acoustic models for automatic speech recognition. For example, sensitive data can be data that is deleted by the system without being stored in a log of data received from client devices. As another example, sensitive data can be data that is deleted within a predetermined period of time of receipt by the system. The techniques include the identification of sensitive data during speech recognition. Before the identified sensitive data is deleted, the data can be used to train an automated speech recognizer. The sensitive data can include, for example, sensitive information within the audio content of the data or sensitive information related to the context of the audio content.

Figure 1:
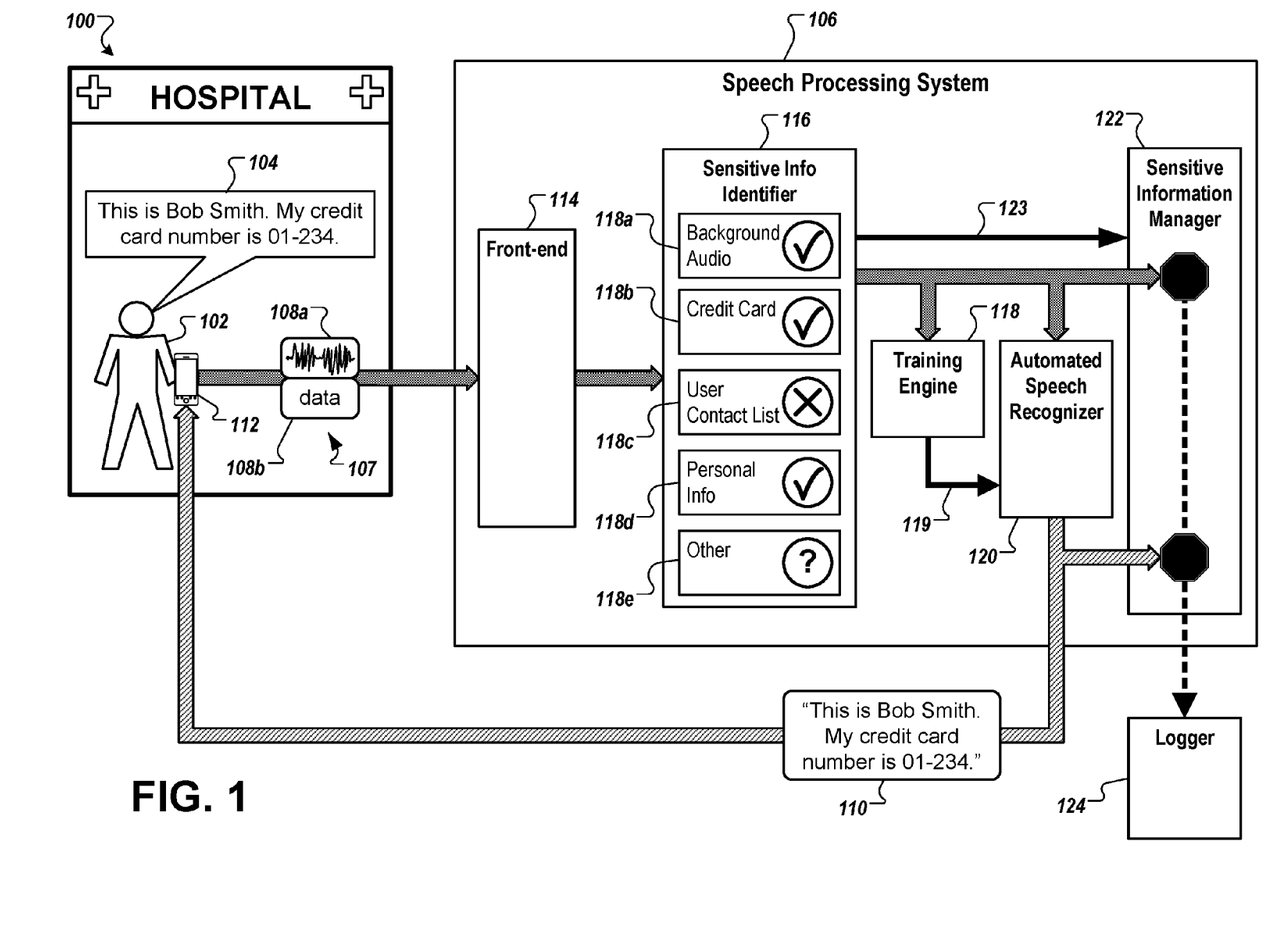
FIG. 1 is a diagram of an example speech recognition system.

FIG. 1 is a diagram of an example speech recognition system 100. A user 102 submits an utterance 104 to a speech processing system 106 for recognition and transcription. In this example, the utterance 104 submitted by user 102 is the phrase "This is Bob Smith. My credit card number is 01-234." The user 102 speaks utterance 104 into a computing device 112, e.g., a mobile computing device, tablet computer, wearable computer, e-book reader, desktop computer, laptop computer, etc. The computing device 112 may be running, for example, a text editor with a speech recognition input, a search-bar with free-form speech input, or any other appropriate program. The computing device 112 may generate a speech recognition request 107, containing a speech data item 108a, e.g., a data file of a waveform, an audio file, or other data type, that encodes the utterance 104.

The speech recognition request 107 may also include context data 108b. The context data 108b may include context information such as, for example, information associated with an application or a web page the user 102 was accessing during the utterance 104, geographic coordinates of the user 102, information associated with the contact list of the user 102, or other context information. Other examples of context data 108b include request 107 metadata, biometric characteristics of the user 102, e.g., gender, age, accent, or other characteristics, the noise conditions, the country/region of residence of the user 102, and the dialog state. In some cases, the speech recognition request 107 may include sensitive data. The computing device 112 may transmit the request 107 to the speech processing system 106.

The speech processing system 106 is a system that receives a speech recognition request 107 associated with an utterance 104, analyzes the request 107, and generates a text transcription 110 of the utterance 104. Generally, the text transcription 110 may include a character string or other text representation that represents the speech recognizer's top hypothesis of the contents of the utterance of the request 107. The transcription 110 may be transmitted to the computing device 112 or to another system or program. The speech processing system 106 may transmit a transcription 110 to user 102 in real-time or near-real-time, for example, tens of milliseconds, hundreds of milliseconds, or another duration of time.

In general, a system such as the speech processing system 106 may receive speech recognition requests 107 from users in a large user base. A speech recognizer system may, in response to each request 107, generate a text result 110 of one or more recognition processes run on the request 107 by the speech recognizer. Although a single user 102 is shown for clarity, a speech recognizer may receive requests 107 from a much larger number of users, e.g., tens of thousands, and may process some or all of the received requests 107 in parallel, providing each user with a text result 110 while other requests 107 are being received and processed.

Additionally, a speech recognizer system may be any type of appropriate system to perform speech recognition tasks. For example, a speech recognizer may be constituted by a group of virtual machines or jobs running on a massively distributed computing environment that is also hosting virtual machines or jobs for different services, tasks, or applications. In some implementations, a speech recognizer may be a component of a large system of servers or services, or may be only one of many services offered in conjunction with some product or service.

The example speech processing system 106 includes a front-end 114 that receives the speech recognition request 107 from the computing device 112. The front-end 114, for example, may receive the speech recognition request 107 and prepare the request 107 data for processing. The front-end 114 may transmit the request 107 to a sensitive information identifier 116. The sensitive information identifier 116 may analyze the request 107 to determine if at least a portion of the data in the request 107 is likely sensitive data.

The sensitive information identifier 116 may identify several types of likely sensitive data in the request 107. The likely sensitive data could be included in the audio data 108a and/or in the context data 108b. The sensitive information identifier 116 may analyze background audio present in the audio data 108a for likely sensitive information. For example, the background audio may contain information identifying the user's location, information identifying speakers other than the user, or other likely sensitive information.

The sensitive information identifier 116 may identify likely sensitive financial information such as credit card information, bank account information, monetary amounts, or other likely sensitive financial information. The sensitive information identifier 116 may also identify user contact information such as persons on the user's contact list, phone numbers, e-mail addresses, or other likely sensitive contact information. The sensitive information identifier 116 may identify likely sensitive personal information such as names, social security numbers, addresses, phone numbers, or other likely sensitive personal information. These are example types of sensitive data that may be identified; in other implementations, other types of sensitive data may be identified. For example, other information may include location information, e.g., Global Positioning System (GPS) coordinates, mobile phone information, wireless access information, web page information, or other information or data.

The sensitive information identifier 116 may include one or more sensitive data classifiers 118a-e, where each classifier 118a-e is associated with a different type of sensitive data. For example, each type of sensitive data described above may have an associated classifier. Each classifier may provide an indication that at least a portion of the request 107 includes sensitive data associated with that classifier. For example, a classifier may provide an indication that the request 107 has a likelihood of containing sensitive data above a confidence threshold associated with that classifier's associated type of sensitive data.

With reference to the example shown in FIG. 1, the sensitive information identifier 116 has identified some likely sensitive information within the request 107. A background audio classifier 118a has identified that background audio likely contains sensitive information. For example, the background audio may contain audio indicating that the user 102 is located in a hospital. A credit card classifier 118b has identified that the audio data 108a of the utterance 104 includes likely sensitive credit card information, i.e., the credit card number "01-234." However, a user contact list classifier 118c has determined that the audio data 108a does not include likely sensitive information about the user's contact list. A personal information classifier 118d has identified likely sensitive personal information, i.e., the name "Bob Smith." Other classifiers, represented by classifier 118e, may determine other types of sensitive data.

The sensitive information identifier 116 may transmit some or all of the request 107 data to a training engine 118. In some cases, the some or all of the request 107 data is transmitted directly to the training engine 118 by the front-end 114. The training engine 118 is a component that trains recognition models that may be used by an automated speech recognizer, e.g. automated speech recognizer 120.

The training engine 118 may use some or all of the audio data 108a and the context data 108b to generate a speech recognition model or update an existing speech recognition model. In some cases, the use of context data 108b with audio data 108a can enable a more accurate speech recognition model than with the use of audio data 108a alone. The speech recognition model may be provided to an automated speech recognizer, shown in FIG. 1 by arrow 119 connecting training engine 118 to automated speech recognizer 120. In this manner, the training engine 118 can use the received data from the request 107, including likely sensitive data, before any likely sensitive data is deleted.

Some or all of the request 107 data is also transmitted to the automated speech recognizer 120. The automated speech recognizer 120 uses a speech recognition model provided by training engine 118 to generate a transcript 110 of the audio data 108a. The transcript 110 is provided to the computing device 112.

Some or all of the request 107 data is also transmitted to a sensitive information manager 122. Additionally, a sensitive information signal 123 may be transmitted from the sensitive information identifier 116 to the sensitive information manager 122. The transcript 110 may also be provided to the sensitive information manager 122. The sensitive information signal 123 may, for example, indicate which portions of the request 107 and/or the transcript 110 are likely to contain sensitive information. The sensitive information signal 123 may be based on indications from classifiers 118a-e. Based on the sensitive information signal 123, the sensitive information manager 122 may determine which portions of the request 107 and/or the transcript 110 are to be logged and which portions are not to be logged. The portions of the request 107 and/or transcript 110 which are not to be logged may be deleted, for example. In some cases, the sensitive information manager 122 may anonymize the request data 107 and/or transcript 110. For example, the transcript "This is Bob Smith" may be anonymized to "This is <name>." Other anonymization techniques are possible. The sensitive information manager 122 may provide portions of the request 107 and/or transcript 110 to the logger 124 for storage.

Figure 2:
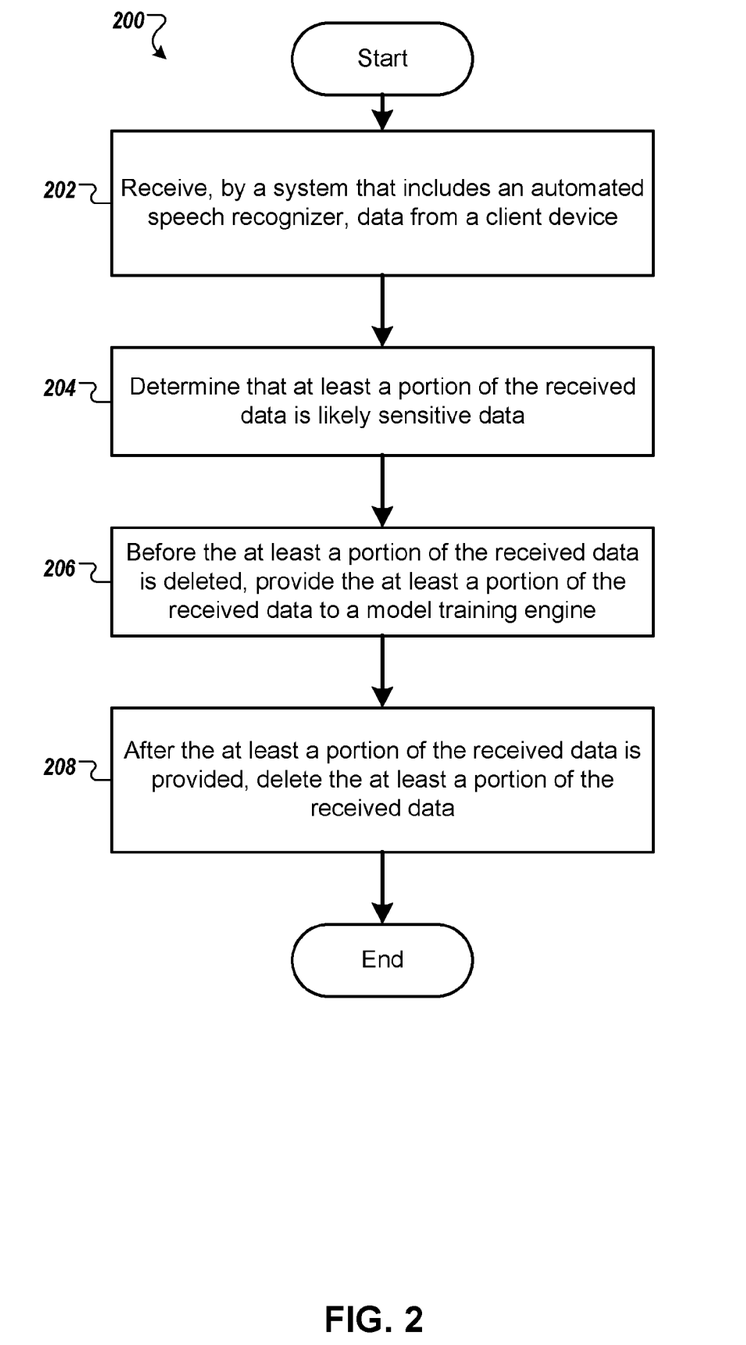
FIG. 2 is a flow chart illustrating an example process for training a speech recognizer.

FIG. 2 is a flow chart illustrating an example process 200 for training an automated speech recognizer. The example process 200 may be implemented, for example, by some or all of speech recognition system 100. At 202, data from a client device is received by a system that includes an automated speech recognizer. For example, the data may include a data file of a waveform, an audio file, or other data type that encodes an utterance, metadata associated with the utterance, transcription data, and/or context data associated with the utterance. The client device may be a portable computer, smartphone, or other client device as described previously. The speech recognizer may use one or more speech recognizer components in generating transcriptions of speech data items such as an acoustic model, a language model, or another type of speech recognizer component. One or more of the speech recognizer components may be neural network-based.

At 204, at least a portion of the received data is determined to likely be sensitive data. In some cases, sensitive data is data that is deleted by the system without being stored in a log of data that is received from client devices. In some cases, sensitive data may include one or more of contact information, background audio data, personally identifying information, predetermined transcription keywords, or geographic coordinates. Sensitive data may also be data that is deleted within a predetermined period of time of receipt by the system. For example, the predetermined period of time may be shorter than a default period of time after which data determined to not be likely sensitive is deleted. In some implementations, each type of sensitive data has an associated predetermined period of time for deletion.

Determining that at least a portion of the received data is likely sensitive data may include providing the at least a portion of the received data to a one or more classifiers. Each classifier may be is associated with a different type of sensitive data. A particular classifier associated with a particular type of sensitive data may generate an indication that the received data is associated with the particular type of sensitive data.

At 206, before the at least a portion of the received data is deleted, the at least a portion of the received data is provided to a model training engine that trains recognition models for the automated speech recognizer. The at least a portion of received data may include audio data and/or context data. In some implementations, an automated speech recognizer may receive an updated recognition model from the model training engine. The updated recognition model may be used by the automated speech recognizer to recognize subsequently received audio data.

At 208, the at least a portion of the received data is deleted after the at least a portion of the received data has been provided to the model training engine. In some implementations, the at least a portion of the received data may be anonymized, and the anonymized data may be stored in the log of data that is received from client devices.

Figure 3:
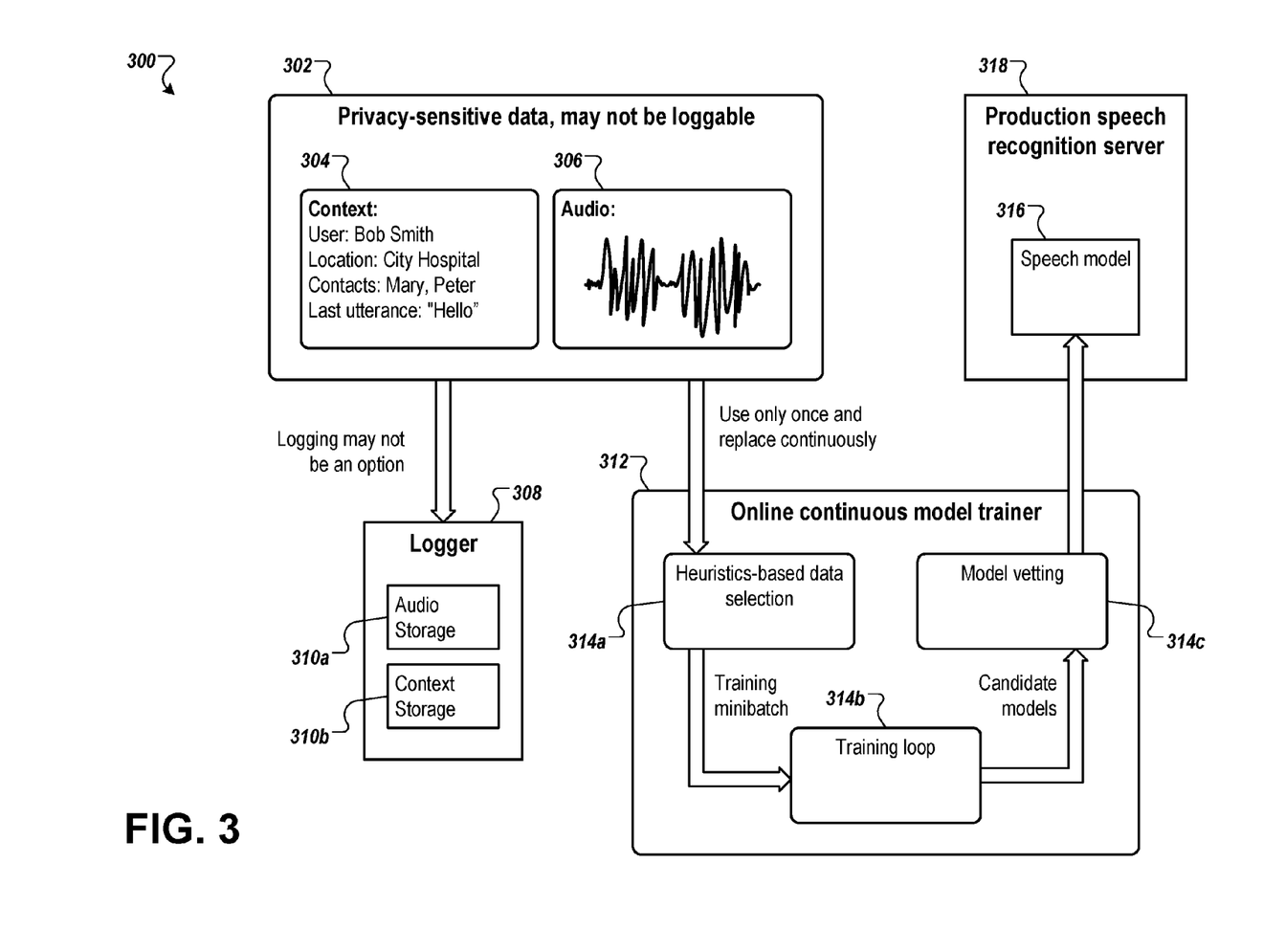
FIG. 3 is a diagram of an example privacy-preserving speech recognition system.

FIG. 3 is a diagram of an example speech recognition system 300. The system 300 may be implemented by, for example, speech recognition system 100 shown in FIG. 1 or the process shown in FIG. 2. The speech recognition system 300 includes privacy-sensitive data 302. The privacy-sensitive data 302 may be a speech recognition request. The privacy-sensitive data 302 may include context information 304 and audio data 306.

A portion of the privacy-sensitive data 302 may be determined to be loggable. For example, a portion of the privacy-sensitive data 302 may not include sensitive information, and that portion may be able to be logged. As another example, a portion of the privacy-sensitive data 302 may be anonymized. The loggable portion of privacy-sensitive data may be provided to a logger 308 for storage. In some implementations, the logger 308 includes a separate audio storage 310*a* and a separate context storage 310*b*. For example, the audio storage 310*a* may store audio data 306 and the context storage may store context data 304. In some implementations the audio data 306 is not stored separately from the context data 304.

Some or all of the privacy-sensitive data may be provided to example model trainer 312. The model trainer 310 may be, for example, a training engine for a speech recognizer. In some implementations, the privacy-sensitive data 302 is used only once for training before deletion, and new privacy-sensitive data 302 is continuously provided to the model trainer 312. The model trainer 312 may include one or more components. For example, the model trainer 312 may select training data from the privacy-sensitive data 302 using heuristic-based data selection, shown at 314*a*. The model trainer 312 may, for example, use minibatch training techniques and training loop techniques to generate candidate models, shown at 314*b*. The candidate models may be vetted and analyzed to identify models having the best performance, shown at 314*c*. Model trainer 312 may include other components or use other techniques.

A speech model 316 may be provided from the model trainer 312 to a production speech recognition server 318. The production speech recognition server 318 can receive speech recognition requests from a client device, and, using one or more speech models 316, provide speech transcriptions back to the client device. In this manner, speech models 316 can be continuously updated using privacy-sensitive data 302 and model trainer 312 while maintaining any policies of the system related to privacy-sensitive data retention.

Figure 4:
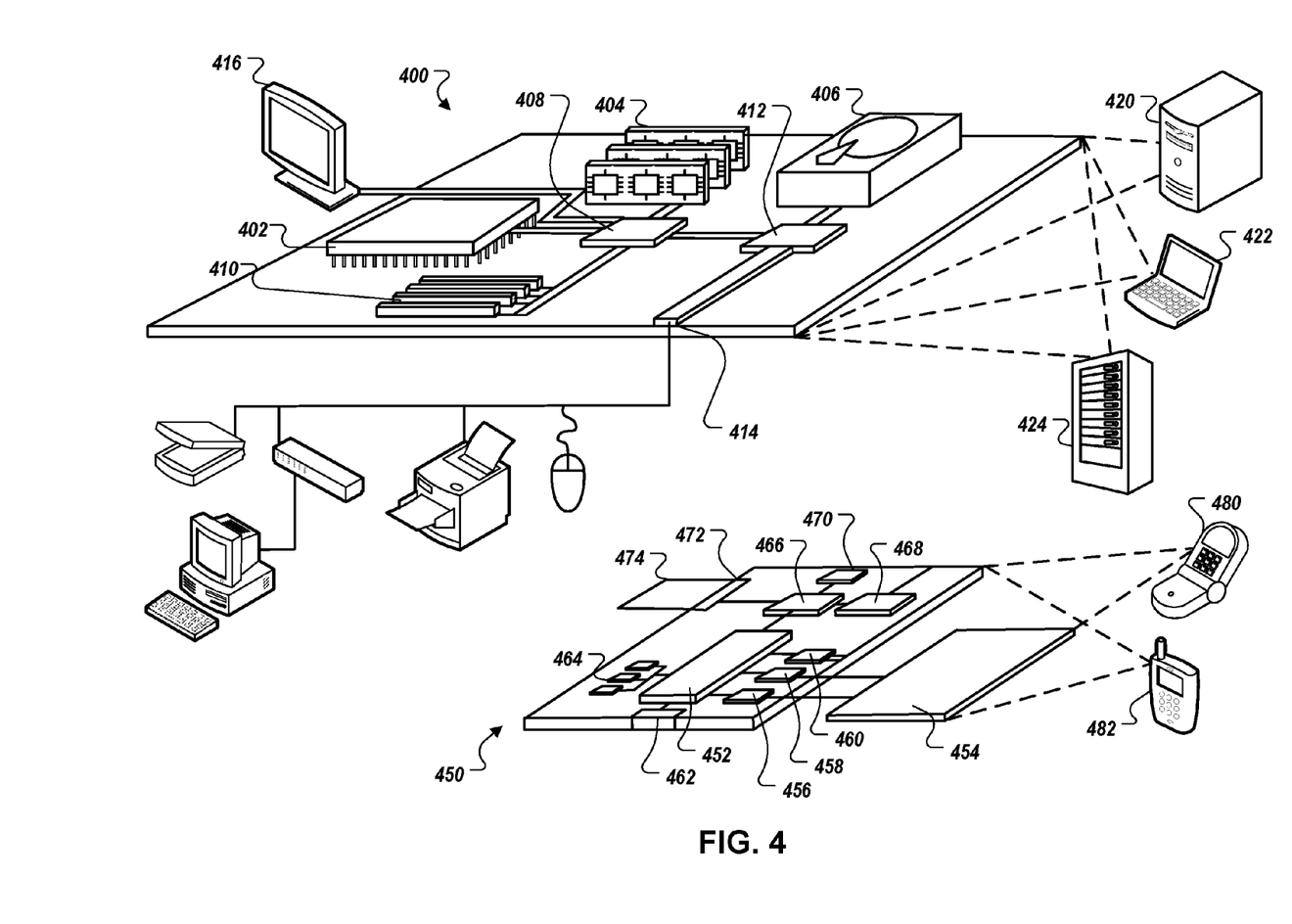
FIG. 4 shows an example of a computing device and an example of a mobile computing device that can be used to implement the techniques described here.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations, e.g., as a server bank, a group of blade servers, or a multi-processor system.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416, e.g., through a graphics processor or accelerator, and to the high-speed expansion ports 410, which may accept various expansion cards, not shown. In the implementation, the low-speed interface 412 is coupled to the storage device 406 and the low-speed expansion port 414. The low-speed expansion port 414, which may include various communication ports, e.g., USB, Bluetooth, Ethernet, wireless Ethernet or others, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, not shown, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound, e.g., voice messages, music files or others, and may also include sound generated by applications operating on the mobile computing device 450.

The mobile computing device 450 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor for displaying information to the user, and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback, and input from the user may be received in any form, including acoustic, speech, or tactile input.

The systems and techniques described here may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the systems and techniques described here, or any combination of such back end, middleware, or front end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, by an automated speech processor, particular audio data corresponding to an utterance that was spoken by a user;
   determining, by the automated speech processor, that at least a portion of the particular audio data likely includes sensitive data that is to be deleted without being logged in a log of audio data;
   before the at least the portion of the particular audio data that likely includes sensitive data is deleted, providing, by the automated speech processor, the particular audio data to an acoustic model training engine that trains acoustic models for the automated speech processor;
   after the particular audio data has been provided to the acoustic model training engine, deleting, by the automated speech processor, the at least the portion of the particular audio;
   receiving, by the automated speech processor and from the acoustic model training engine, an updated acoustic model that was trained using the at least the portion of the particular audio data; and
   using, by the automated speech processor, the updated acoustic model to recognize subsequently received audio data.

2. The method of claim 1, wherein the sensitive data is data is to be deleted after a shorter period time than a default period of time after which data that is determined to not be likely sensitive data is deleted.

3. The method of claim 1, wherein each type of sensitive data has an associated predetermined period of time for deletion.

4. The method of claim 1, comprising anonymizing the at least the portion of the received audio data.

5. The method of claim 1, wherein the sensitive data comprises contact information.

6. The method of claim 1, wherein the sensitive data comprises personally identifying information.

7. The method of claim 1, wherein the sensitive data comprises sensitive financial information.

8. The method of claim 1, wherein the sensitive data comprises one or more predetermined keywords.

9. A system comprising:
   one or more computers and one or more storage devices storing instructions that are operable, when executed by the one or more computers, to cause the one or more computers to perform operations comprising:
   receiving, by an automated speech processor, particular audio data corresponding to an utterance that was spoken by a user;
   determining, by the automated speech processor, that at least a portion of the particular audio data likely includes sensitive data that is to be deleted without being logged in a log of audio data;
   before the at least the portion of the particular audio data that likely includes sensitive data is deleted, providing, by the automated speech processor, the particular audio data to an acoustic model training engine that trains acoustic models for the automated speech processor;
   after the particular audio data has been provided to the acoustic model training engine, deleting, by the automated speech processor, the at least the portion of the particular audio;
   receiving, by the automated speech processor and from the acoustic model training engine, an updated acoustic model that was trained using the at least the portion of the particular audio data; and
   using, by the automated speech processor, the updated acoustic model to recognize subsequently received audio data.

10. The system of claim 9, wherein the sensitive data is data is to be deleted after a shorter period time than a default period of time after which data that is determined to not be likely sensitive data is deleted.

11. The system of claim 9, wherein each type of sensitive data has an associated predetermined period of time for deletion.

12. The system of claim 9, wherein the operations comprise anonymizing the at least the portion of the received audio data.

13. The system of claim 9, wherein the sensitive data comprises contact information.

14. The system of claim 9, wherein the sensitive data comprises personally identifying information.

15. The system of claim 9, wherein the sensitive data comprises sensitive financial information.

16. The system of claim 9, wherein the sensitive data comprises one or more predetermined keywords.

17. A computer-readable non-transitory medium storing software comprising instructions executable by one or more computers which, upon such execution, cause the one or more computers to perform operations comprising:

receiving, by an automated speech processor, particular audio data corresponding to an utterance that was spoken by a user;

determining, by the automated speech processor, that at least a portion of the particular audio data likely includes sensitive data that is to be deleted without being logged in a log of audio data;

before the at least the portion of the particular audio data that likely includes sensitive data is deleted, providing, by the automated speech processor, the particular audio data to an acoustic model training engine that trains acoustic models for the automated speech processor;

after the particular audio data has been provided to the acoustic model training engine, deleting, by the automated speech processor, the at least the portion of the particular audio;

receiving, by the automated speech processor and from the acoustic model training engine, an updated acoustic model that was trained using the at least the portion of the particular audio data; and using, by the automated speech processor, the updated acoustic model to recognize subsequently received audio data.

18. The medium of claim 17, wherein the sensitive data is data is to be deleted after a shorter period time than a default period of time after which data that is determined to not be likely sensitive data is deleted.

19. The medium of claim 17, wherein each type of sensitive data has an associated predetermined period of time for deletion.

20. The medium of claim 17, wherein the operations comprise anonymizing the at least the portion of the received audio data.

* * * * *